(12) United States Patent
Hallbeck

(10) Patent No.: US 11,523,596 B1
(45) Date of Patent: Dec. 13, 2022

(54) FISH CATCHING DEVICE

(71) Applicant: Tim Hallbeck, Cottonwood Heights, UT (US)

(72) Inventor: Tim Hallbeck, Cottonwood Heights, UT (US)

( * ) Notice: Subject to any disclaimer, the term of this patent is extended or adjusted under 35 U.S.C. 154(b) by 378 days.

(21) Appl. No.: 16/930,617

(22) Filed: Jul. 16, 2020

(51) Int. Cl.
  *A01K 69/08* (2006.01)
  *A01K 79/00* (2006.01)
  *A01K 99/00* (2006.01)
  *A01M 23/08* (2006.01)
  *A01K 69/06* (2006.01)

(52) U.S. Cl.
  CPC .............. *A01K 69/08* (2013.01); *A01K 69/06* (2013.01); *A01K 79/00* (2013.01); *A01K 99/00* (2013.01); *A01M 23/08* (2013.01)

(58) Field of Classification Search
  CPC ........ A01K 69/00; A01K 69/06; A01K 69/08; A01K 71/00; A01K 74/00; A01K 79/00; A01K 99/00; A01K 97/01; A01M 23/08; B63B 35/14; E02B 1/006; E02B 8/08; E02B 8/085
  USPC .......... 43/64–66, 100, 103, 4; 114/364, 255; 119/219
  See application file for complete search history.

(56) References Cited

U.S. PATENT DOCUMENTS

| | | | | |
|---|---|---|---|---|
| 3,004 A | * | 3/1843 | Cook ..................... | A01K 69/00 43/10 |
| 82,490 A | * | 9/1868 | Cartwright ............. | A01K 69/06 43/100 |
| 257,597 A | * | 5/1882 | Long ...................... | A01K 73/06 43/8 |
| 301,653 A | * | 7/1884 | Williams ............... | A01K 69/00 43/13 |
| 478,579 A | * | 7/1892 | Dunham ................ | A01K 73/06 43/8 |
| 586,863 A | * | 7/1897 | Nelson ................... | A01K 69/06 43/102 |
| 808,102 A | * | 12/1905 | Mattle .................... | A01K 69/06 43/102 |
| 969,970 A | * | 9/1910 | Moen ..................... | A01K 69/06 43/103 |
| 972,232 A | * | 10/1910 | Pike ....................... | A01K 69/06 43/103 |
| 1,115,752 A | * | 11/1914 | Vick ...................... | A01K 73/06 200/84 R |

(Continued)

FOREIGN PATENT DOCUMENTS

| CN | 106665513 A | * | 5/2017 | ............ A01K 74/00 |
|---|---|---|---|---|
| KR | 20150052659 A | * | 5/2015 | |

(Continued)

*Primary Examiner* — Darren W Ark
(74) *Attorney, Agent, or Firm* — Cramer Patent & Design, PLLC; Aaron R. Cramer

(57) ABSTRACT

A fish catching device includes a modular frame member having a buoyant device secured to a first side of the frame member and the second side of the frame member is capable of being secured to a watercraft. The frame member incorporates a plurality of apertures. A plurality of one-way doors is provided, each hingedly secured to the frame and cover an individual aperture. The device is configured to rest above a surface of water permitting a fish to jump through any of the doors thereby causing the fish to slow its trajectory and direct it to enter the watercraft.

15 Claims, 5 Drawing Sheets

(56) References Cited

U.S. PATENT DOCUMENTS

| | | | | | |
|---|---|---|---|---|---|
| 1,120,206 | A | * | 12/1914 | Knapp | A01D 44/00 56/8 |
| 1,138,541 | A | * | 5/1915 | Conekin | A01K 75/02 123/73 D |
| 1,163,078 | A | * | 12/1915 | Gandy | A01K 97/00 43/4 |
| 1,307,513 | A | * | 6/1919 | Olson | A01K 69/00 43/13 |
| 1,332,653 | A | * | 3/1920 | Wakefield | A01K 79/00 119/202 |
| 1,449,570 | A | * | 3/1923 | Wood | A01K 74/00 43/102 |
| 1,467,763 | A | * | 9/1923 | Lybeck | A01K 79/00 114/144 R |
| 1,486,485 | A | * | 3/1924 | Frissell | A01K 80/00 43/6.5 |
| 1,489,917 | A | * | 4/1924 | Blecker | A01K 74/00 43/17.5 |
| 1,490,428 | A | * | 4/1924 | Paris | A01K 74/00 43/8 |
| 1,659,413 | A | * | 2/1928 | Suarez | A01K 69/00 43/13 |
| 1,699,828 | A | * | 1/1929 | Wyckoff | A01K 69/00 210/488 |
| 2,030,793 | A | * | 2/1936 | Horn | A01K 97/20 43/55 |
| 2,064,408 | A | * | 12/1936 | Blecker | A01K 74/00 43/6.5 |
| 2,241,314 | A | * | 5/1941 | Mohler | A01K 97/20 383/117 |
| 2,413,552 | A | * | 12/1946 | Ethridge | A01K 74/00 43/103 |
| 2,677,210 | A | * | 5/1954 | Abrahamsen | A01K 69/06 43/103 |
| 2,739,410 | A | * | 3/1956 | Budnick | B65D 1/32 383/3 |
| 2,794,191 | A | * | 6/1957 | Gaskouitz | B63B 43/14 114/364 |
| 2,832,168 | A | * | 4/1958 | Brown | A01K 79/02 43/9.6 |
| 3,170,458 | A | * | 2/1965 | Anderlie | F24C 1/16 126/271.3 |
| 3,478,463 | A | * | 11/1969 | Ruter | A01K 97/20 43/55 |
| 3,524,278 | A | * | 8/1970 | Wolfe | A01K 97/20 43/55 |
| 3,587,123 | A | * | 6/1971 | O'Boyle | B63B 27/14 114/364 |
| 3,596,394 | A | * | 8/1971 | Reeder | A01K 97/05 43/6.5 |
| 3,693,573 | A | * | 9/1972 | Murphy | B63B 59/02 114/362 |
| 3,717,124 | A | * | 2/1973 | Jacobs | A01K 61/60 43/56 |
| 3,754,348 | A | * | 8/1973 | Ramsey | A01K 69/08 43/103 |
| 3,786,592 | A | * | 1/1974 | Miller | A01K 74/00 43/6.5 |
| 3,793,760 | A | * | 2/1974 | Puretic | A01K 73/06 43/4.5 |
| 3,805,722 | A | * | 4/1974 | Melchert, Jr. | B63B 35/14 114/343 |
| 3,815,279 | A | * | 6/1974 | Poirot | A01K 69/00 43/17 |
| 3,922,812 | A | * | 12/1975 | Steele | A01K 15/02 43/100 |
| 4,086,717 | A | * | 5/1978 | Aucoin, Jr. | A01K 74/00 43/6.5 |
| 4,092,797 | A | * | 6/1978 | Azurin | A01K 71/00 43/105 |
| 4,141,168 | A | | 2/1979 | Nishi | |
| 4,372,243 | A | * | 2/1983 | Roope, Jr. | B63B 17/00 114/364 |
| 4,429,659 | A | * | 2/1984 | Holyoak | A01K 69/08 43/103 |
| 4,458,621 | A | * | 7/1984 | De Clifford | A01K 74/00 43/6.5 |
| 4,473,967 | A | * | 10/1984 | Poirot | A01K 69/06 43/100 |
| 4,570,374 | A | * | 2/1986 | Baxley | A01K 97/20 43/55 |
| 4,672,764 | A | * | 6/1987 | Dempsey | A01K 97/00 43/4 |
| 4,706,409 | A | * | 11/1987 | Downing | A01K 69/08 43/100 |
| 4,794,723 | A | * | 1/1989 | Arnold | A01K 97/04 43/56 |
| 4,862,627 | A | * | 9/1989 | Keller | A01K 97/01 43/17 |
| 4,887,382 | A | * | 12/1989 | Moritz | A01K 69/06 43/102 |
| 4,905,404 | A | * | 3/1990 | Pasion | A01K 97/20 43/56 |
| 4,932,149 | A | * | 6/1990 | Coleman | A01K 79/00 43/6.5 |
| 5,025,747 | A | * | 6/1991 | Grayson | B63B 27/14 114/343 |
| 5,048,222 | A | * | 9/1991 | Correll | A01K 80/00 43/104 |
| 5,199,211 | A | | 4/1993 | McKenzie | |
| 5,259,809 | A | * | 11/1993 | Rainey, Jr. | A01K 69/06 119/213 |
| 5,301,450 | A | * | 4/1994 | Boyd | A01K 75/00 43/104 |
| 5,343,442 | A | | 8/1994 | Vielberth | |
| 5,575,102 | A | * | 11/1996 | Coulon | A01K 80/00 43/104 |
| 5,692,450 | A | * | 12/1997 | Alter | B63B 34/05 114/61.15 |
| 6,119,615 | A | * | 9/2000 | Porat | B63B 27/14 114/364 |
| D462,737 | S | * | 9/2002 | Lipari | D22/136 |
| D471,249 | S | * | 3/2003 | Walters | D22/134 |
| 6,618,978 | B1 | * | 9/2003 | Miranowski | A01K 97/01 43/4 |
| 6,694,662 | B1 | * | 2/2004 | McClure | A01K 97/01 43/4 |
| D540,418 | S | * | 4/2007 | Walters | D22/136 |
| 7,222,743 | B1 | * | 5/2007 | Wilhelm | A01K 97/06 220/560 |
| 7,644,674 | B1 | * | 1/2010 | Goldston | B63B 43/14 114/364 |
| 7,975,425 | B1 | * | 7/2011 | VanBurch | A01K 79/02 43/17.1 |
| 8,919,034 | B2 | | 12/2014 | Alhuwaishel | |
| 9,045,200 | B1 | * | 6/2015 | Chaney | B63B 34/05 |
| 9,439,406 | B1 | * | 9/2016 | Kuny | A01K 97/01 |
| 9,961,887 | B2 | * | 5/2018 | Ma | A01K 75/00 |
| 10,375,940 | B2 | | 8/2019 | Al-Farhan | |
| 2001/0029694 | A1 | * | 10/2001 | Bodden | A01K 61/60 43/102 |
| 2001/0045047 | A1 | * | 11/2001 | Smolinski | A01K 97/01 43/5 |
| 2004/0111949 | A1 | * | 6/2004 | Pendzimas | A01K 97/01 43/4 |
| 2005/0132633 | A1 | * | 6/2005 | Carnahan, III | A01K 79/00 43/4.5 |
| 2005/0284012 | A1 | * | 12/2005 | Lessman | A01K 77/00 43/4 |
| 2007/0251441 | A1 | * | 11/2007 | Herndon | B63C 11/48 362/253 |
| 2009/0133317 | A1 | * | 5/2009 | Walther | A01M 23/08 43/61 |
| 2012/0117850 | A1 | * | 5/2012 | Panovic | A01K 79/00 43/4.5 |
| 2014/0053451 | A1 | * | 2/2014 | Brown | A01K 97/01 43/55 |

(56) References Cited

U.S. PATENT DOCUMENTS

| | | | | |
|---|---|---|---|---|
| 2017/0013813 A1* | 1/2017 | Ma | .................... | A01K 73/04 |
| 2017/0013814 A1* | 1/2017 | Ma | .................... | A01K 73/06 |
| 2019/0281801 A1* | 9/2019 | Powers | ............... | A01K 77/00 |
| 2019/0289836 A1* | 9/2019 | Doberenz | ............ | A01K 79/02 |
| 2021/0259222 A1* | 8/2021 | Lovett | ................ | A01K 69/08 |

FOREIGN PATENT DOCUMENTS

| | | | |
|---|---|---|---|
| KR | 20150056383 A * | 5/2015 | |
| RU | 2198510 C2 * | 2/2003 | |
| WO | WO-2016172834 A1 * | 11/2016 | |

* cited by examiner

1

FISH CATCHING DEVICE

RELATED APPLICATIONS

None.

FIELD OF THE INVENTION

The present invention relates to a fish catching device.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman to catch more fish quickly. One type of fish, targeted by many fishermen, is that of the silver fin carp.

Once known as an invasive fish species, it is now coveted by many due to its mild taste. One unique characteristic of this fish is that it will jump many feet out of the water when excited by noise such as that from a boat engine. As each fish jumps, it tends to also excite neighboring fish to also jump out of the water. It is not uncommon to have dozens of fish in the air around a boat at any one moment.

Some of these fish simply jump into the boat where they are caught with no work at all. Unfortunately, they may also jump back out of the boat as well. Finally, as some of these fish can weigh up to 40 pounds, they pose a physical risk should they hit fishermen in the boat. Accordingly, there exists a need for a means by which silver fin car can be easily caught without the disadvantages as described above. The development of the fish catching device fulfills this need.

SUMMARY OF THE INVENTION

The principles of the present invention provide for a fish catcher device which comprises a support frame which has an outer frame and an inner frame, a flap grid which has a plurality of one-way flaps that allow a fish to jump through the support frame from the water towards a boat, while preventing the fish from returning to the water, a buoyant support which includes an attachment ring removably coupled with the support frame and a coupling means which include a plurality of fasteners for removably attaching the fish catcher device to the side of the boat. The plurality of fasteners may include a plurality of clips or a plurality of hook and loop fasteners.

The outer frame may include a plurality of tubular pieces, a plurality of corner connectors, and a plurality of side connectors. The tubular pieces, the corner connectors, and the side connectors may define an outermost square-like frame to support the fish catcher device. The outer frame and the inner frame may combine to define a series of nine square-shaped apertures. The one-way flaps may each be attached to the support frame by a pair of attachment rings that may pass through a pair of attachment ring holes in each of the one-way flaps. The attachment rings may be coupled on a single side of each of the one-way flaps so that each of the one-way flaps pivot about the support frame in just one direction.

The one-way flaps may be provided in a grid-like fashion, such that the fish catcher device may include a distal flap row nearest the top of the fish catcher device, a middle flap row, and a proximal flap row nearest the bottom of the fish catcher device. Each of the one-way flaps of the flap grid may be made of transparent material that allow a user to view the surface of the water beneath the fish catcher device while riding in the boat alongside. Each one of the one-way flaps of the flap grid may be made of translucent material that allow the user to view the surface of the water beneath the fish catcher device while riding in the boat alongside.

The one-way flaps may be structured and arranged in such a manner so that the one-way flaps may be dimensionally larger than the square-shaped apertures that they rest upon.

The coupling means may include a plurality of clips and may allow for rotational flexibility between the fish catcher device and the boat due to waves, boat movements, and other environmental elements. The fish catcher device may be a carp catcher device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
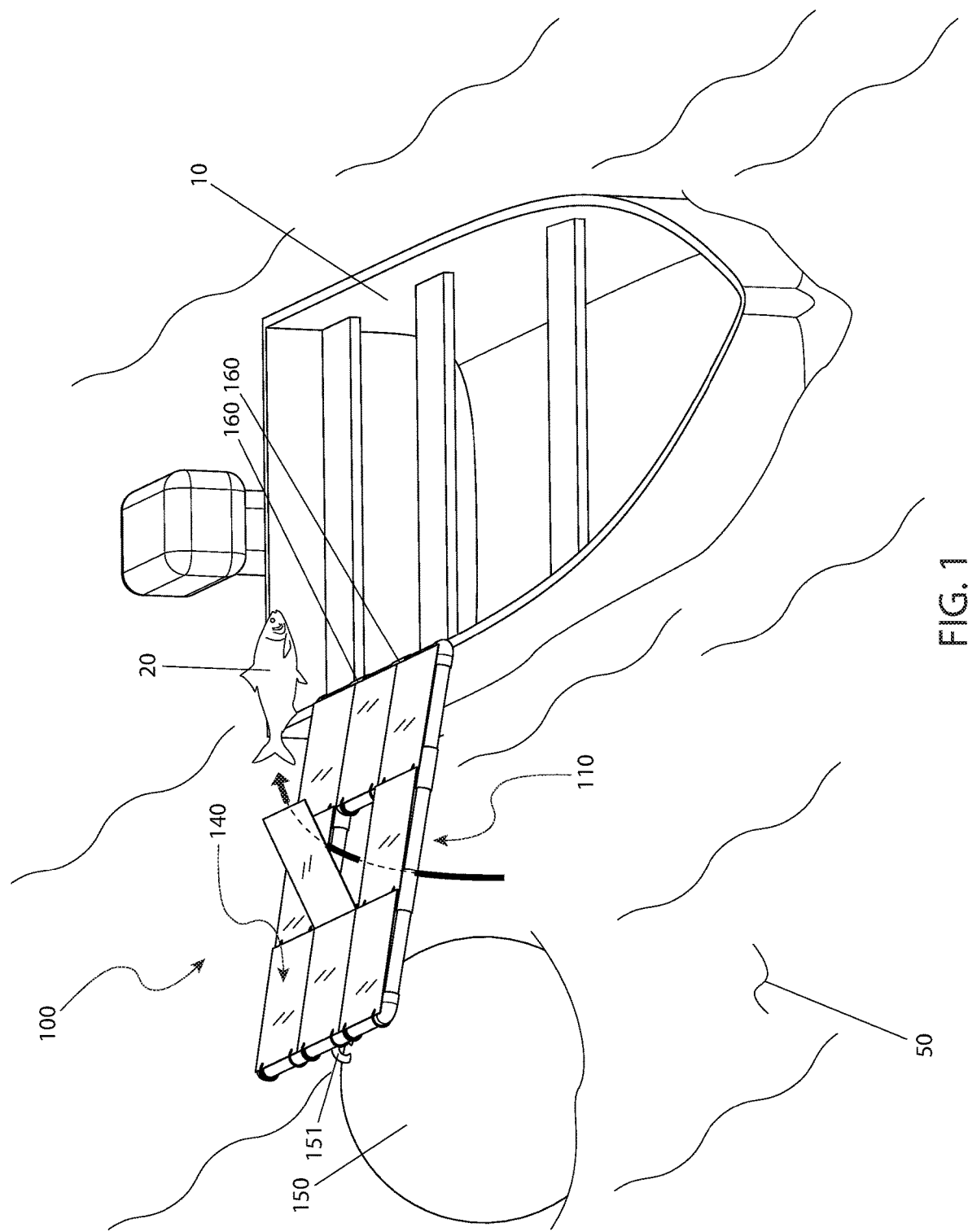
FIG. 1 is a side perspective view of the carp catcher device, illustrating the device 'in-use' on the side of a boat, according to the preferred embodiment of the present invention.

10 boat
20 carp
50 body of water
100 carp catcher device
110 support frame
111 top
112 bottom
113 right side
114 left side
115 front side
116 back side
120 outer frame
121 tubular piece
122 corner connector
123 side connector
130 inner frame
131 four-way connector
140 flap grid
141 one-way flap
142 attachment ring
143 distal flap row
144 middle flap row
145 proximal flap row
146 attachment ring holes
150 buoyant support 151 attachment ring
160 coupling means

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a side perspective view of the carp catcher device 100, illustrating the device 'in-use' on the side of a boat 10, according to the preferred embodiment of the present invention is disclosed. The carp catcher device 100 may include a support frame 110 having an outer frame 120 and an inner frame 130, a flap grid 140, a buoyant support 150, and a coupling means 160. The flap grid 140 may include a plurality of one-way flaps 141 configured to allow a carp 20 to jump through the support frame 110 from the water 50 towards the boat 10, while preventing the carp 20 from returning to the water 50. The coupling means 160 may include clips, a hook and loop fastener, hardware components, and/or other suitable means for removably attaching the carp catcher device 100 to the side of a boat 10, while still allowing for rotational flexibility between the device 100 and the boat due to waves, boat movements, and other environmental elements. The buoyant support 150 may include an attachment ring 151 configured to removably couple with the support frame 110. As indicated with the coupling means 160 for attaching the support frame 110 to the boat 10, the attachment ring 151 of the buoyant support 150 may similarly include straps, fasteners, rope, or a combination of other suitable hardware for coupling the buoyant support 150 to the support frame 110.

Figure 2:
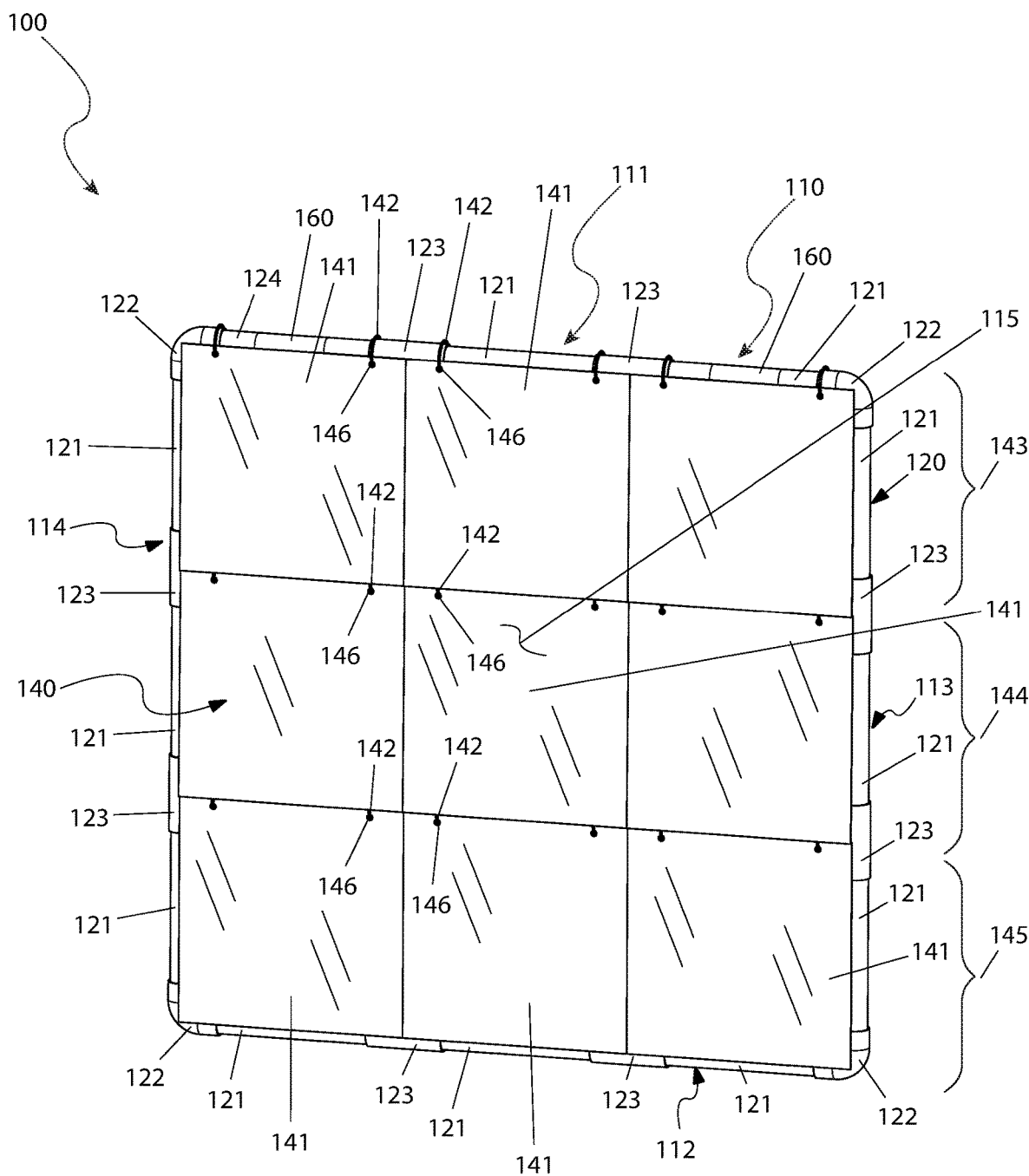
FIG. 2 is a front side perspective view of the carp catcher device, according to the preferred embodiment of the present invention.

Referring next to FIG. 2, a front side perspective view of the carp catcher device 100, according to the preferred embodiment of the present invention is depicted. This view illustrates the support frame 110 having a top 111, a bottom 112, a right side 113, a left side 114, a front side 115, and a back side 116 (not shown; first illustrated in FIG. 3). The support frame 110 may further include an outer frame 120 comprising a plurality of tubular pieces 121, a plurality of corner connectors 122, and a plurality of side connectors 123, whereby the tubular pieces 121, corner connectors 122, and side connectors 123 define an outermost square-like frame to support the device 100. The carp catcher device 100 may also include a flap grid 140 comprising a plurality of one-way flaps 141 that are attached to the support frame 110 by means of attachment rings 142. Each of the one-way flaps 141 may be coupled to the support frame 110 by a pair of the attachment rings 142 that pass through a pair of attachment ring holes 146 in each of the one-way flaps 141. The attachment rings 142 may be coupled on a single side of each of the one-way flaps 141 so that each of the one-way flaps 141 may pivot about the support frame 110 in just one direction. The one-way flaps 141 may be provided in a grid-like fashion, such that the device 100 includes a distal flap row 143 nearest the top 111 of the device 100, a middle flap row 144, and a proximal flap row 145 nearest the bottom 112 of the device 100.

Figure 3:
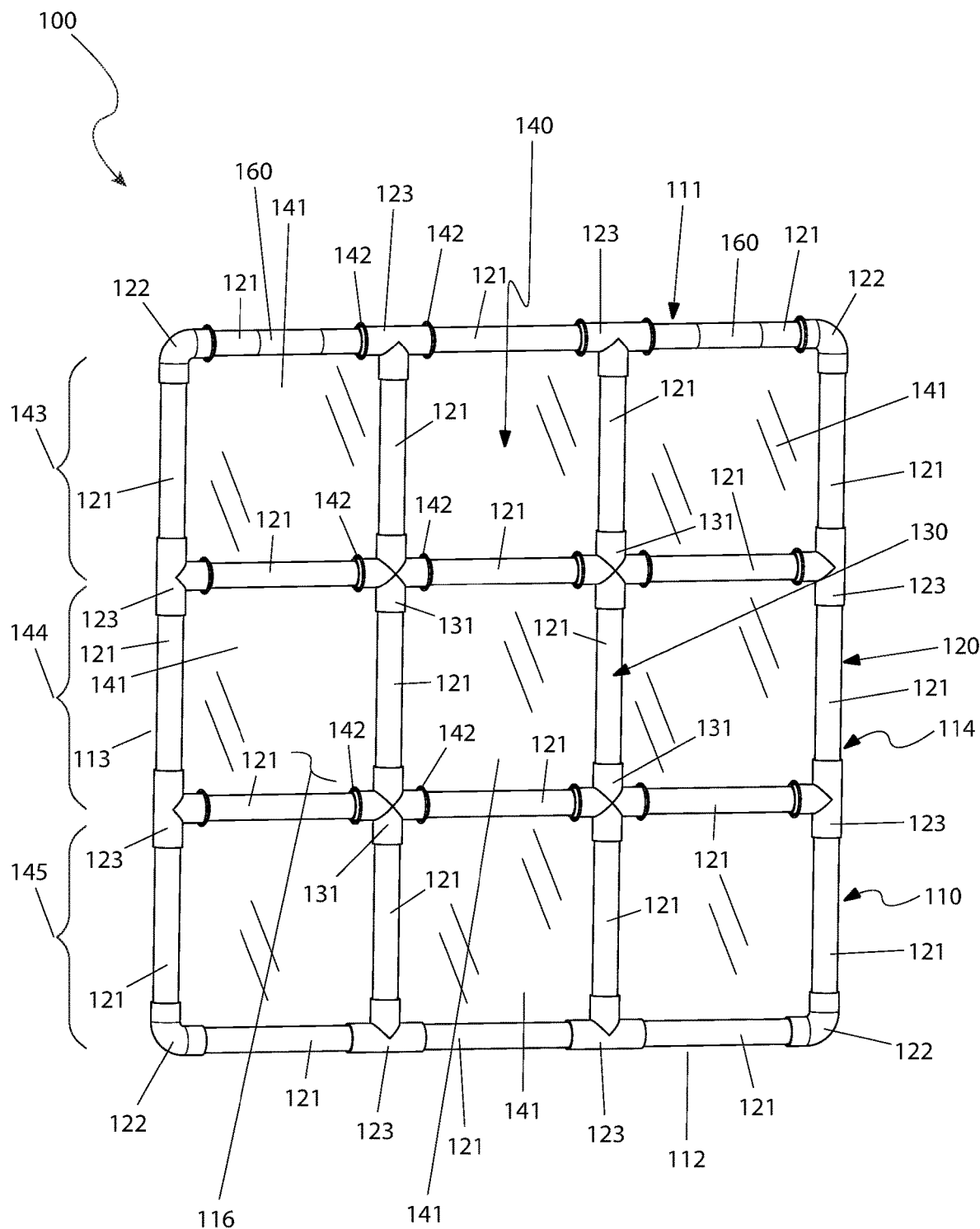
FIG. 3 is a back side perspective view of the carp catcher device, according to the preferred embodiment of the present invention.

Referring now to FIG. 3, a back side perspective view of the carp catcher device 100, according to the preferred embodiment of the present invention is shown. From this view, the back side 116 of the support frame 110 is more clearly illustrated. The support fame 110 may include an outer frame 120 and an inner frame 130. Together, the outer frame 120 and inner frame 130 may combine to define a series of nine (9) new square-shaped apertures covered by the flap grid 140 and one-way flaps 141 of which a carp may jump through. The inner frame may comprise a plurality of tubular pieces 121, and a plurality of four-way connectors 131, whereby the tubular pieces 121 and four-way connectors 131 define an inner-most grid-based frame to support the device 100 as well as the flap grid 140 resting thereupon. Each of the one-way flaps 141 of the flap grid 140 may be configured from transparent and/or translucent materials that allow a user to view the surface of the water beneath the device 100 while riding in the boat 10 alongside. The one-way flaps 141 may be structured and arranged in such a manner so that the one-way flaps 141 are dimensionally larger than the square-shaped apertures that they rest upon. This configuration allows for the one-way flaps 141, rotationally anchored in place by the attachment rings 142, to rotate open towards the front side 115 only.

Figure 4:
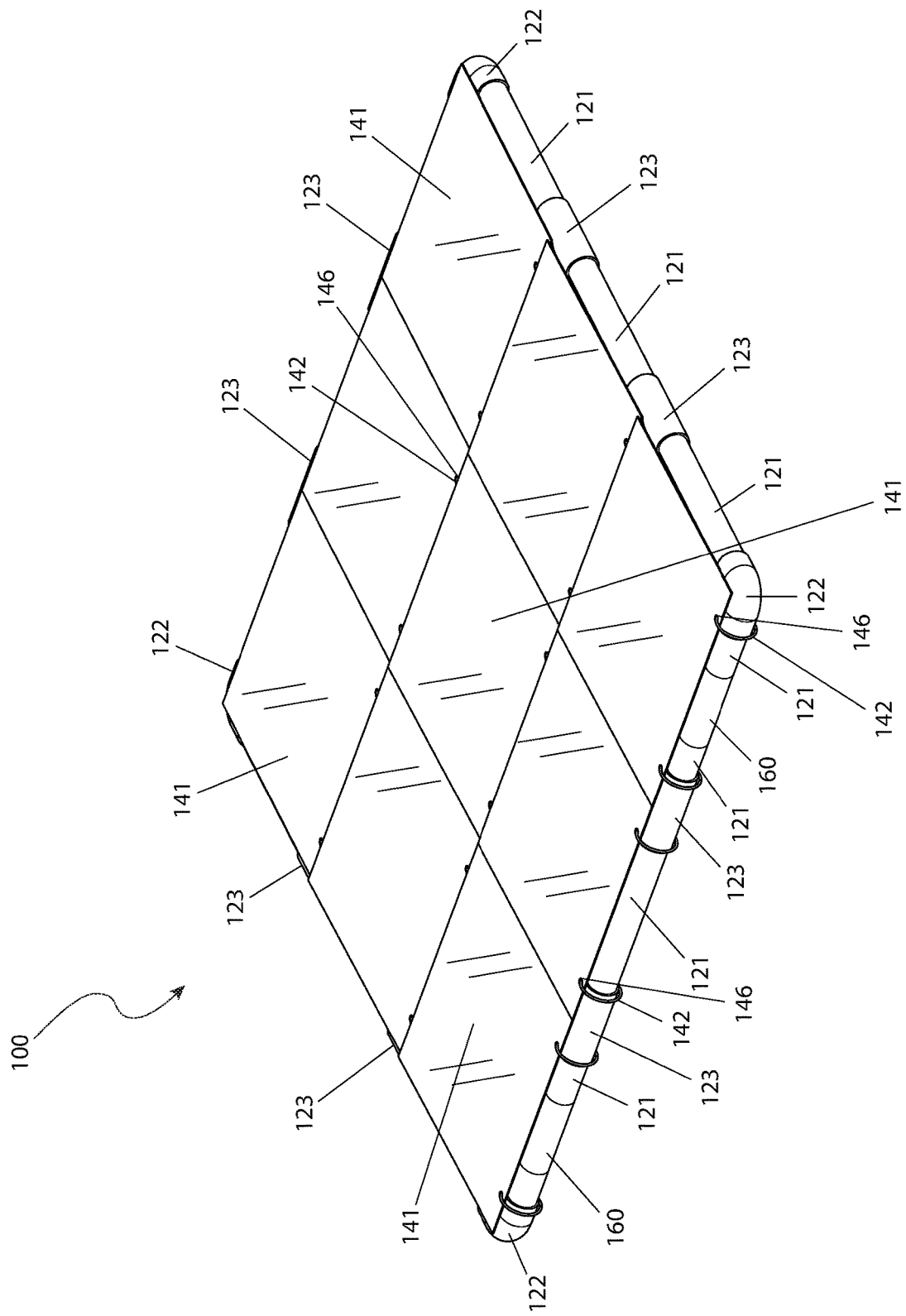
FIG. 4 is a top perspective view of the carp catcher device, according to the preferred embodiment of the present invention; and, FIG. 5 is a front side exploded view of the carp catcher device, illustrating the individual components of the outer frame and the inner frame, according to the preferred embodiment of the present invention.

Referring next to FIG. 4, a top perspective view of the carp catcher device 100, according to the preferred embodiment of the present invention is disclosed. Similar to FIG. 2, this view illustrates the support frame 110 having a top 111, a bottom 112, a right side 113, a left side 114, and a front side 115. The support frame 110 includes an outer frame 120 comprising a plurality of tubular pieces 121, a plurality of corner connectors 122, and a plurality of side connectors 123. The carp catcher device 100 may also include a flap grid 140 comprising a plurality of one-way flaps 141 that are attached to the support frame 110 by means of attachment rings 142. Each of the one-way flaps 141 may be coupled to a tubular piece 121 of the support frame 110 by a pair of the attachment rings 142. The attachment rings may pass through a pair of attachment ring holes 146 in each of the one-way flaps 141. The one-way flaps 141 may be transparent in configuration and provide a grid-like fashion to cover each of the square-shaped apertures defined by the components of the outer frame 120 and inner frame 130.

Figure 5:
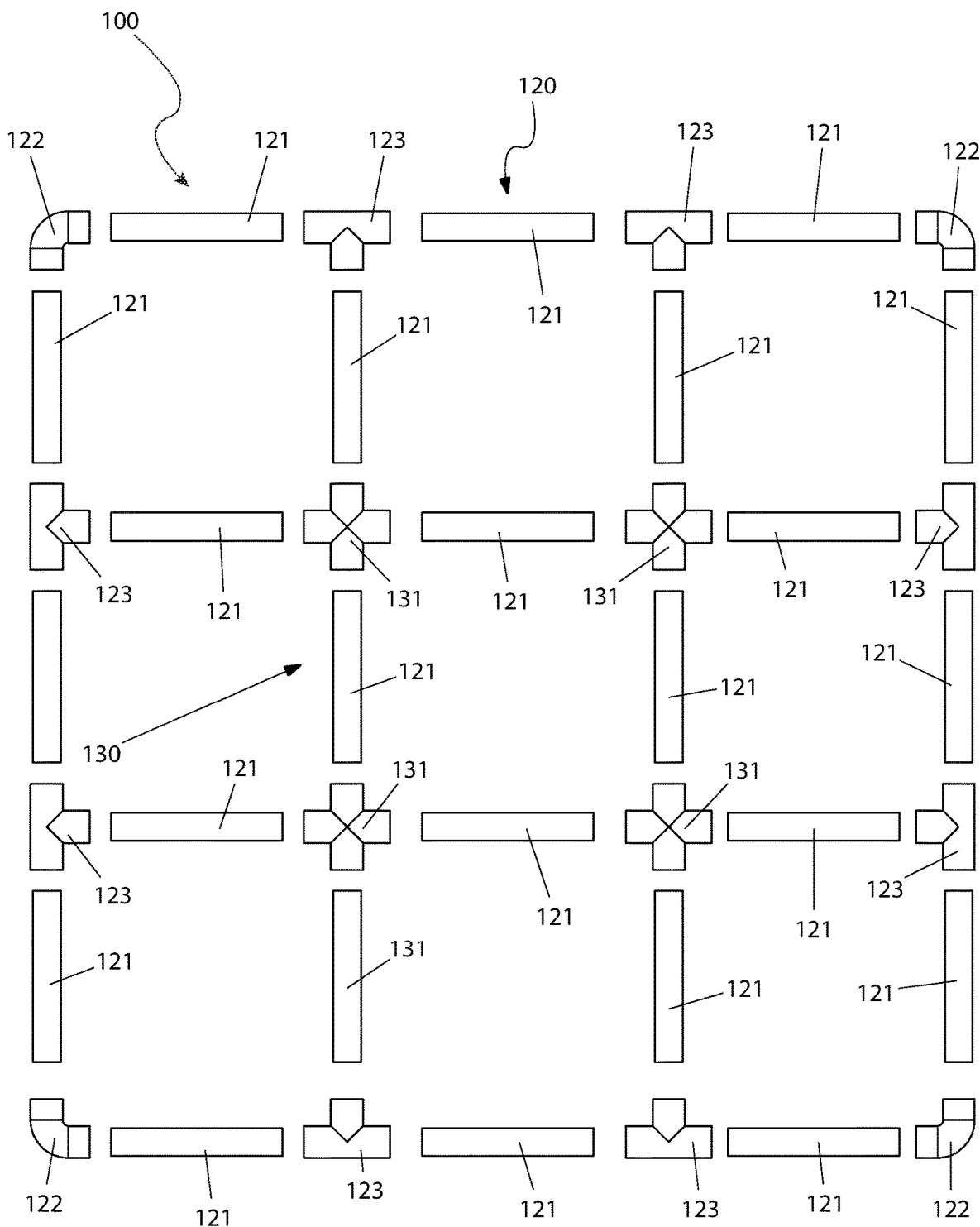

Referring finally to FIG. 5, a front side exploded view of the carp catcher device 100, illustrating the individual support frame 110 components, according to the preferred embodiment of the present invention is disclosed. The support frame 110 components (when connected) may include an outer frame 120 comprising a plurality of tubular pieces 121, a plurality of corner connectors 122, and a plurality of side connectors 123, whereby the tubular pieces 121, corner connectors 122, and side connectors 123 define an outermost square-like frame to support the device 100. The inner frame may comprise a plurality of tubular pieces 121, and a plurality of four-way connectors 131, whereby the tubular pieces 121 and four-way connectors 131 define an inner-most grid-based frame to support the device 100 as well as the flap grid 140 (not shown) resting thereupon. Together, when connected and fully assembled, the outer frame 120 and inner frame 130 may combine to define a series of nine (9) new square-shaped apertures.

2. Operation of the Preferred Embodiment

The preferred embodiment of the present invention can be utilized by the common user in a simple and effortless manner with little or no training. It is envisioned that the carp catcher device 100 would be constructed in general accordance with FIG. 1 through FIG. 5. The user would procure the carp catcher device 100 through normal procurement channels, paying particular attention to the relevant specifications required for the boat 10 desired.

After procurement and prior to utilization, the carp catcher device 100 would be installed upon the side of a boat 10 using a coupling means 160. During utilization of the carp catcher device 100, a user would simply place the device 100 out upon the surface of the water 50 with the buoyant support 150 resting away from the boat. From there, a user may wait for a carp 20 to jump through one of the one-way flaps 141. When this happens, the one-way flap 141 may return to a closed-state back upon the support frame 110, thereby trapping the carp 20 on the front side 115 of the device 100 until the user may retrieve the carp 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A fish catcher device, comprising:
    a support frame having an outer frame and an inner frame, wherein the outer frame and the inner frame combine to define a series of apertures;
    a flap grid having a plurality of one-way flaps that allow a fish to jump through the support frame from the water towards a boat, while preventing the fish from returning to the water, wherein each of the plurality of one-way flaps is pivotally attached to the support frame adjacent a respective aperture of the series of apertures;
    a buoyant support including an attachment ring removably coupled with the support frame;
    a coupling means including a plurality of fasteners for removably attaching the fish catcher device to a side of a boat.

2. The fish catcher device, according to claim 1, wherein the outer frame includes a plurality of tubular pieces, a plurality of corner connectors, and a plurality of side connectors.

3. The fish catcher device, according to claim 2, wherein the tubular pieces, the corner connectors, and the side connectors define the outer frame which comprises an outermost square-like frame to support the fish catcher device.

4. The fish catcher device, according to claim 1, wherein the series of apertures further comprises nine square-shaped apertures.

5. The fish catcher device, according to claim 4, wherein the one-way flaps are structured and arranged in such a manner so that the one-way flaps are dimensionally larger than the square-shaped apertures that they respectively rest upon.

6. The fish catcher device, according to claim 1, wherein the one-way flaps are each pivotally attached to the support frame by a pair of attachment rings that pass through a pair of attachment ring holes in each of the one-way flaps.

7. The fish catcher device, according to claim 6, wherein the attachment rings pass through the pair of attachment ring holes which are located on a single side of each of the one-way flaps so that each of the one-way flaps pivot about the support frame in just one direction.

8. The fish catcher device, according to claim 1, wherein the one-way flaps of the flap grid are provided in a grid-like fashion, such that the fish catcher device includes a distal flap row nearest a top of the fish catcher device, a middle flap row, and a proximal flap row nearest a bottom of the fish catcher device.

9. The fish catcher device, according to claim 1, wherein each of the one-way flaps of the flap grid are made of transparent material that allow a user to view the surface of the water beneath the fish catcher device while riding in the boat alongside.

10. The fish catcher device, according to claim 1, wherein each of the one-way flaps of the flap grid are made of translucent material that allow the user to view the surface of the water beneath the fish catcher device while riding in the boat alongside.

11. The fish catcher device, according to claim 1, wherein the plurality of fasteners includes a plurality of clips.

12. The fish catcher device, according to claim 1, wherein the plurality of fasteners includes a plurality of hook and loop fasteners.

13. The fish catcher device, according to claim 1, wherein the coupling means includes a plurality of hardware components.

14. The fish catcher device, according to claim 1, wherein the coupling means allows for rotational flexibility between the fish catcher device and the boat due to waves, boat movements, and other environmental elements.

15. The fish catcher device, according to claim 1, wherein the fish catcher device is a carp catcher device.

* * * * *